S. SCHNEIDER.
RETAINER FOR BALL BEARINGS.
APPLICATION FILED AUG. 3, 1910.
1,006,688.
Patented Oct. 24, 1911.
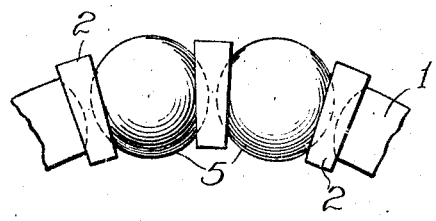
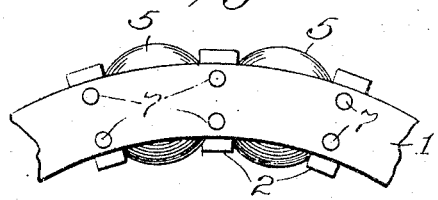
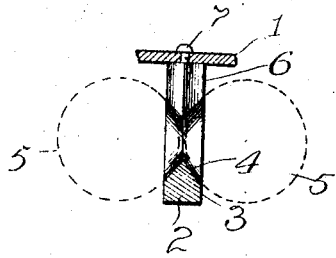 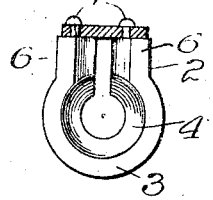
Witnesses
H. R. L. White
R. A. White
Inventor
Stefan Schneider
By Robert Klotz, Atty

UNITED STATES PATENT OFFICE.

STEFAN SCHNEIDER, OF CHICAGO, ILLINOIS, ASSIGNOR TO THE UNITED STATES BALL BEARING MANUFACTURING COMPANY, OF OAK PARK, ILLINOIS, A CORPORATION OF ILLINOIS.

RETAINER FOR BALL-BEARINGS.

1,006,688.  Specification of Letters Patent.  Patented Oct. 24, 1911.

Application filed August 3, 1910. Serial No. 575,260.

*To all whom it may concern:*

Be it known that I, STEFAN SCHNEIDER, a subject of the Emperor of Germany, and residing at Chicago, in the county of Cook and State of Illinois, have invented a new and useful Improvement in Retainers for Ball-Bearings, of which the following is a complete specification.

The main objects of this invention are to provide a retainer for ball bearings which is especially adapted for the larger sized balls employed in heavy work; to provide a retainer for ball bearings in which the spacers for the balls are approximately U shaped and are each attached to the retaining ring at two points to provide a rigid structure; and to provide a cheap, simple and strong retainer adapted to hold the balls so closely together that approximately 95% of the ball space will be occupied by the balls.

A specific construction embodying the invention is illustrated in the accompanying drawings, in which:

Figure 1 is a fragmentary side elevation of one side of a retainer embodied in this invention. Fig. 2 is a fragmentary side elevation of the opposite side of the retainer. Fig. 3 is a fragmentary longitudinal section of the retainer. Fig. 4 is a fragmentary transverse section of the retainer showing one of the spacers in elevation.

In the construction shown the retaining ring 1 is flattened in a plane at right angles to its axis and is provided with two concentric rows of apertures in which are secured the spacers 2 which all project from the same side of the ring. Said spacers are preferably formed of triangular iron bars of the proper length, which bars are bent to an approximately U shape. The central or retaining portion 3 of each spacer is bent in the form of a true circle, and the beveled faces 4 form seats for the balls 5. The ends 6 of the rods are brought comparatively close together and are bent outwardly from the central portion 3 and parallel with each other, as shown more clearly in Fig. 4. Each end 6 is provided with a stud 7 which is adapted to be secured in one of the apertures in the ring, which apertures are so arranged that the spacers lie in planes coinciding with the radii of the ring.

When assembling the device the first spacer is secured to the ring and a ball is placed in the seat on one side thereof and the next spacer is then secured in place and so on until the last spacer is reached, which spacer is then placed in position by placing its ends 6 between the last and first balls and forcing the spacer toward the ring. The beveled faces on said ends permit the spacers to be forced between the balls and into position for its studs 7 to be secured in the ring. Should one of the balls break while in the bearing the spacers may be sprung laterally enough to permit a new ball to be inserted, or one spacer adjacent to the place where the ball is to be inserted may be removed and after the ball has been placed the spacer may be replaced as before described.

The form of the spacers permits a maximum amount of balls to be contained in the retainer, and it also permits the retainer to be made very strong and at a minimum cost.

While I have shown but one embodiment of the invention it will be understood that various details of the construction shown may be varied or omitted without departing from the scope of the claims.

I claim:

1. A retainer for ball bearings, comprising a ring, and a plurality of approximately U shaped spacers on the ring, each spacer having both its legs in alinement with the same radius of the ring, said spacers being spaced equidistant apart on the ring and having their legs beveled on both faces toward their inner edges.

2. A retainer for ball bearings, comprising a ring having a plurality of sets of radially alined apertures therein, a plurality of U shaped spacers each secured in one of said sets of apertures and having its legs in radial alinement on the ring, said spacers having their inner edges beveled on both sides of the spacer for the full length thereof.

3. A retainer for ball bearings, comprising a ring, and a plurality of ball spacers mounted on the ring, each spacer comprising a pair of parallel legs connected at one end in radial alinement to the ring and integrally connected together at their other end by a circular retaining portion, said retaining portion and the legs being beveled on both faces adjacent to their inner edges.

4. A retainer for ball bearings, comprising a ring, and a plurality of ball spacers in the ring, each spacer comprising two parallel legs secured at one end to the ring in radial alinement and a circular retaining portion integrally connected to the inner ends of said legs and opening through one side to the space between said legs.

In witness whereof I have hereunto subscribed my name in the presence of two witnesses.

STEFAN SCHNEIDER.

Witnesses:
W. W. WITHENBURY,
ERNST GRIPPEL.